United States Patent
Liu et al.

(10) Patent No.: US 9,565,554 B2
(45) Date of Patent: Feb. 7, 2017

(54) METHOD, DEVICE, AND SYSTEM FOR TRANSMITTING INFORMATION AND STORAGE MEDIUM

(71) Applicant: Xiaomi Inc., Beijing (CN)

(72) Inventors: Guilin Liu, Beijing (CN); Xinwei Li, Beijing (CN); Zhongyu Yang, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/135,004

(22) Filed: Apr. 21, 2016

(65) Prior Publication Data

US 2016/0316357 A1    Oct. 27, 2016

(30) Foreign Application Priority Data

Apr. 24, 2015 (CN) .......................... 2015 1 0202319

(51) Int. Cl.
| | |
|---|---|
| *H04B 1/38* | (2015.01) |
| *H04W 8/20* | (2009.01) |
| *H04W 8/18* | (2009.01) |
| *H04W 12/06* | (2009.01) |

(52) U.S. Cl.
CPC ............. *H04W 8/205* (2013.01); *H04W 8/183* (2013.01); *H04W 12/06* (2013.01)

(58) Field of Classification Search
CPC ........ H04W 12/06; H04W 4/001; H04W 8/26; H04W 12/04

USPC .... 455/558, 557, 432.1–432.3, 435.1–435.3, 455/410, 411, 403, 422.1, 426.1, 426.2, 455/550.1, 445; 726/27, 28, 30, 26, 4, 3
See application file for complete search history.

(56) References Cited

U.S. PATENT DOCUMENTS

| | | | | |
|---|---|---|---|---|
| 9,020,479 | B1 * | 4/2015 | Somayajula | H04W 48/18 455/418 |
| 2010/0106967 | A1 * | 4/2010 | Johansson | H04L 9/12 713/158 |

\* cited by examiner

*Primary Examiner* — Keith Ferguson
(74) *Attorney, Agent, or Firm* — Finnegan, Henderson, Farabow, Garrett & Dunner LLP (57) ABSTRACT

A method for transmitting information performed by a terminal is disclosed. The method includes: acquiring a first network identifier of a detected wireless communication network; sending a SIM card information request to a server, the SIM card information request including at least the first network identifier; receiving identity information and encryption data of a first SIM card sent by the server, the first SIM card corresponding to the detected wireless communication network corresponding to the first network identifier included in the SIM card information request; and joining the detected wireless communication network corresponding to the first network identifier using the identity information and encryption data of the first SIM card, and transmitting information through the detected wireless communication network.

16 Claims, 9 Drawing Sheets

METHOD, DEVICE, AND SYSTEM FOR TRANSMITTING INFORMATION AND STORAGE MEDIUM

CROSS-REFERENCE TO RELATED APPLICATIONS

This application is based upon and claims the benefit of priority to Chinese Patent Application No. 201510202319.7, filed on Apr. 24, 2015, the entire contents of which are incorporated herein by reference.

TECHNICAL FIELD

The present disclosure relates to the field of computer technology, particularly to a method, device, and system for transmitting information and a storage medium.

BACKGROUND

The improvement of mobile terminal technology has been very quickly. As a result, a mobile terminal finds more and more applications in user's daily life, and has become one of the most important tools. Telecommunication providers offer international roaming services which provide information transmission services to the user who travels or does business abroad.

When traveling in a foreign country, the user turns on the international roaming service in her mobile terminal. When the user wishes to transmit information while abroad, the mobile terminal transmits the information to be transmitted to a local wireless communication network, which forwards the information to a wireless communication network that provides the SIM (Subscriber Identity Module) card installed on the mobile terminal. The information is then transmitted and processed by the wireless communications network that provides the SIM card of the mobile terminal.

SUMMARY

According to a first aspect of the present disclosure, there is provided a method for transmitting information performed by a terminal The method includes: acquiring a first network identifier of a detected wireless communication network; sending a SIM card information request to a server, the SIM card information request including at least the first network identifier; receiving identity information and encryption data of a first SIM card sent by the server, the first SIM card corresponding to the detected wireless communication network corresponding to the first network identifier included in the SIM card information request; and joining the detected wireless communication network corresponding to the first network identifier using the identity information and encryption data of the first SIM card, and transmitting information through the detected wireless communication network.

According to another aspect of the present disclosure, there is provided a method for transmitting information performed by a server. The method includes: receiving a SIM card information request sent by a mobile terminal, wherein the SIM card information request including at least one network identifier acquired by the mobile terminal; selecting a first network identifier from the at least one network identifier, and determining identity information and encryption data of a first SIM card corresponding to the first network identifier; and sending the identity information and encryption data of the first SIM card to the mobile terminal.

According to another aspect of the present disclosure, there is provided a device for transmitting information. The device includes: a processor; and a memory for storing instructions executable by the processor. The processor is configured to: acquire a first network identifier of a detected wireless communication network; send a SIM card information request to a server, the SIM card information request including at least the first network identifier; receive identity information and encryption data of a first SIM card sent by the server, the first SIM card corresponding to the detected wireless communication network corresponding to the first network identifier included in the SIM card information request; and join the detected wireless communication network corresponding to the first network identifier using the identity information and encryption data of the first SIM card, and transmit information through the detected wireless communication network.

According to another aspect of the present disclosure, there is provided a device for transmitting information. The device includes: a processor; and a memory for storing instructions executable by the processor. The processor is configured to: receive a SIM card information request sent by a mobile terminal, wherein the SIM card information request including at least one network identifier acquired by the mobile terminal; select a first network identifier from the at least one network identifier, and determine identity information and encryption data of a first SIM card corresponding to the first network identifier; and send the identity information and encryption data of the first SIM card to the mobile terminal.

It shall be appreciated that the above general description and the detailed description hereinafter are only illustrative and interpretative, but not for limiting the present disclosure.

BRIEF DESCRIPTION OF THE DRAWINGS

The accompanying drawings herein, which are incorporated into and constitute a part of the specification, illustrate embodiments consistent with the present disclosure, and together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
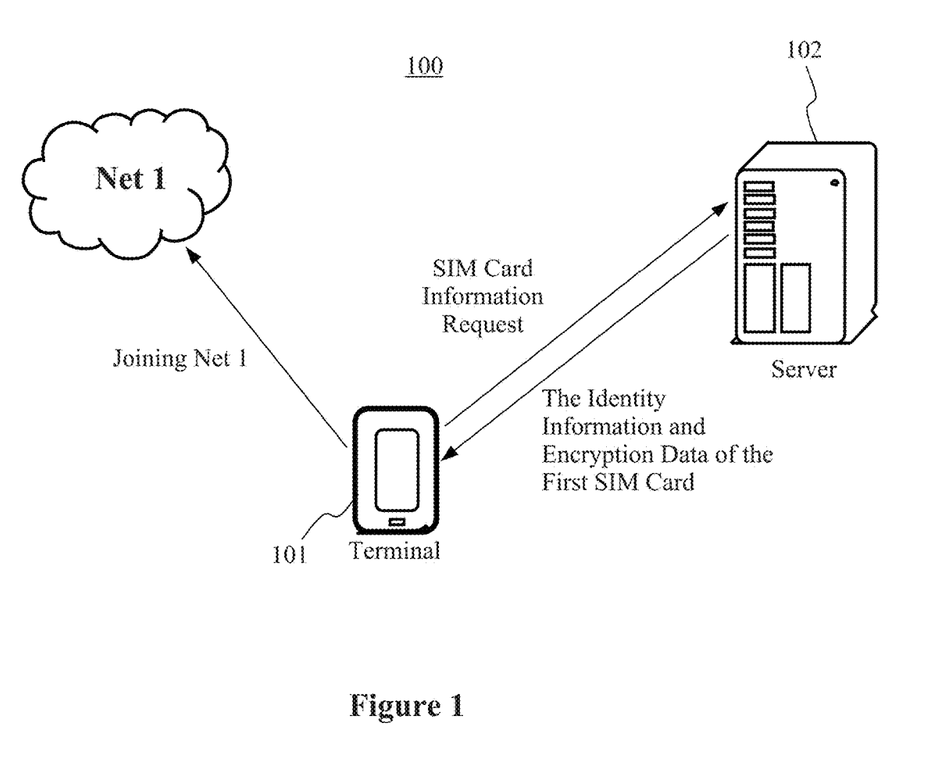
FIG. 1 shows a system for transmitting information, consistent with embodiments of the present disclosure.

FIG. 1 shows a system 100 for transmitting information consistent with embodiments of the present disclosure. As shown in FIG. 1, the system 100 includes a terminal 101 and a server 102.=

Figure 2:
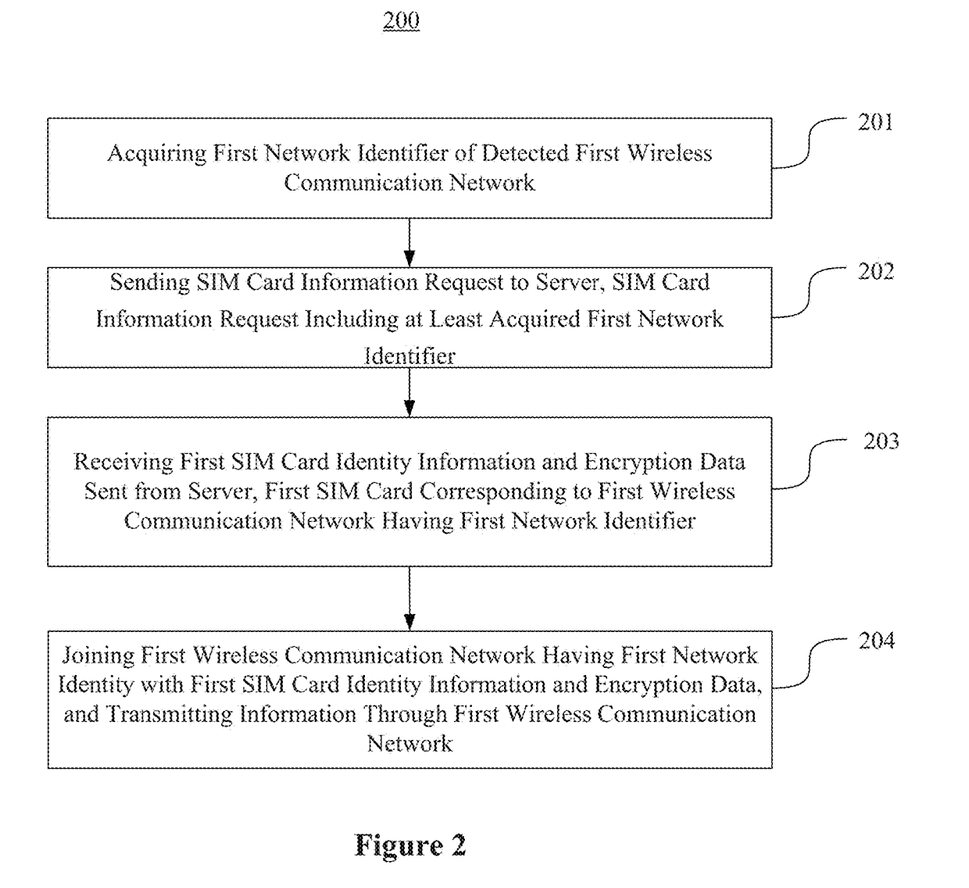
FIG. 2 is a flow chart showing a method for transmitting information, consistent with embodiments of the present disclosure.

FIG. 2 is a flow chart showing a method 200 for transmitting information. The method 200 may be performed by a terminal, such as the terminal 101 shown in FIG. 1. Referring to FIGS. 1 and 2, the method 200 includes the following steps.

In step 201, the terminal 101 acquires a first network identifier of a detected first wireless communication network of at least one communication provider.

In step 202, the terminal 101 sends a SIM (subscriber identity module) card information request to a server, such as the server 102. The SIM card information request includes at least the acquired first network identifier.

In step 203, the terminal 101 receives first SIM card identity information and encryption data sent from the server 102. The first SIM card corresponds to the first wireless communication network having the first network identifier.

In step 204, the terminal 101 joins the first wireless communication network having the first network identifier with the first SIM card identity information and encryption data, and transmits information through the first wireless communication network.

Figure 3:
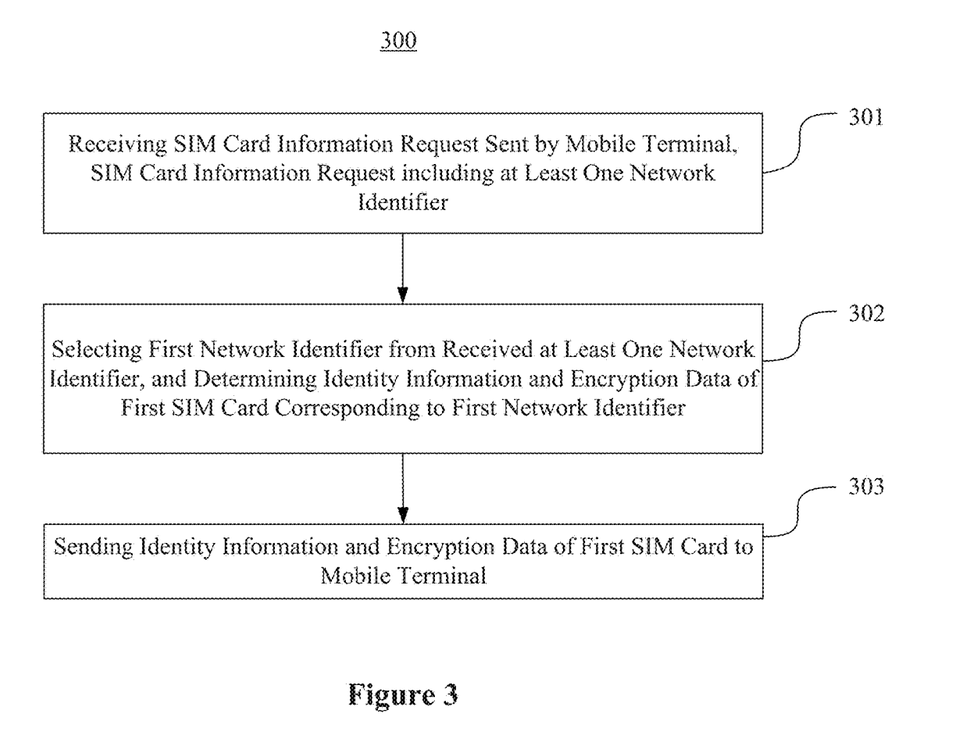
FIG. 3 is a flow chart showing another method for transmitting information, consistent with embodiments of the present disclosure.

FIG. 3 is a flow chart showing a method 300 for transmitting information. The method 300 may be performed by a server, such as the server 102 shown in FIG. 1. Referring to FIGS. 1 and 3, the method 300 includes the following steps.

In step 301, the server 102 receives a SIM card information request sent by a mobile terminal, such as the mobile terminal 101. The SIM card information request includes at least one network identifier acquired by the mobile terminal.

In step 302, the server 102 selects a first network identifier from the received at least one network identifier, and determines identity information and encryption data of a first SIM card, which are pre-stored in a storage device coupled to the server 102, corresponding to the first network identifier. The identity information and encryption data of the first SIM card are determined according to correlation between identity information and encryption data of a plurality of SIM cards, and the network identifiers of wireless communication networks.

In step 303, the server 102 sends the identity information and encryption data of the first SIM card to the mobile terminal.

In the illustrated embodiments, a mobile terminal detects nearby wireless communication networks and acquires a first network identifier of one detected first wireless communication network of at least one communication provider. The mobile terminal sends a SIM card information request to a server, the SIM card information request including the acquired first network identifier, and receives identity information and encryption data of a first SIM card sent by the server. The first SIM card corresponds to the first wireless communication network having the first network identifier so that the mobile terminal may join the first wireless communication network using the identity information and encryption data of the first SIM card, and transmit information through the first wireless communication network. In the illustrated embodiments, the mobile terminal may transmit information through a local wireless communication network, without going through the wireless communication network that provides the SIM card installed in the mobile terminal. Therefore, the efficiency of information transmission is improved.

Figure 4:
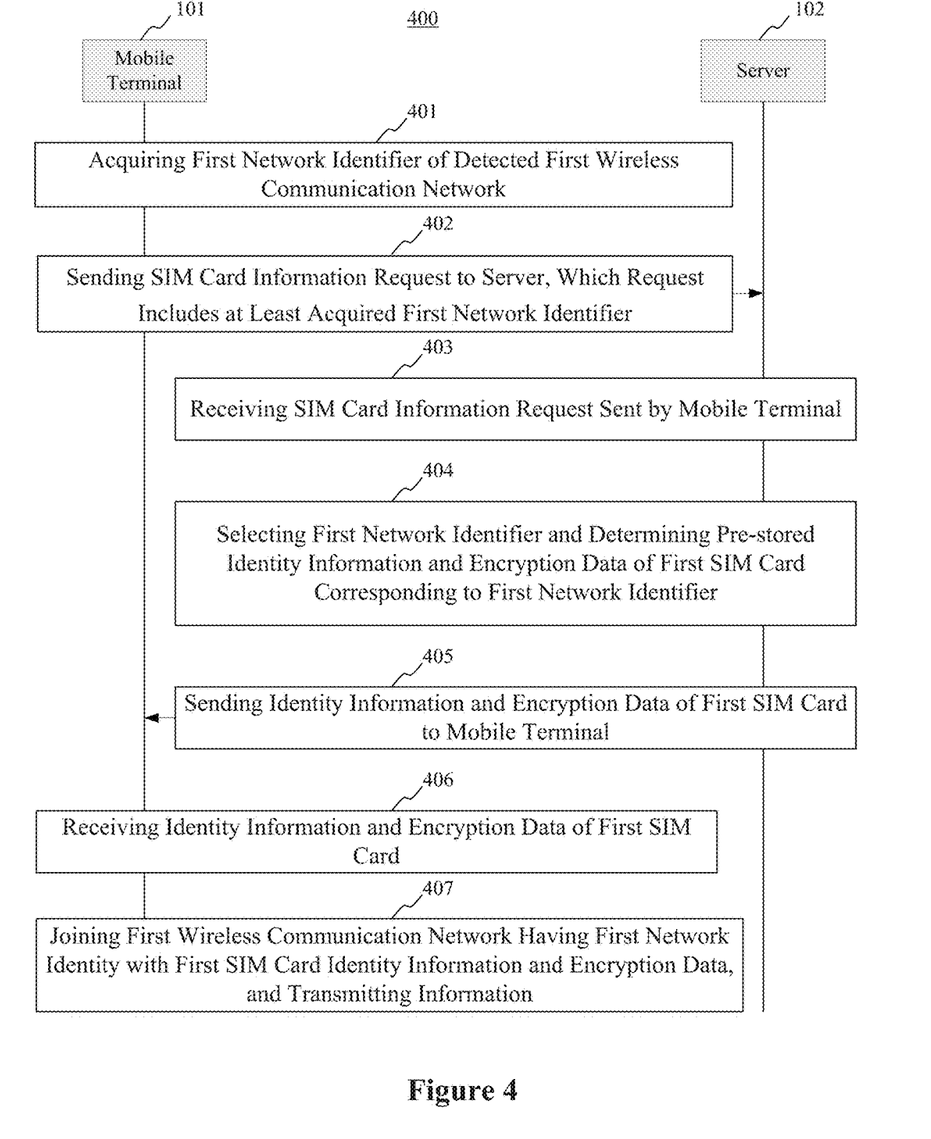
FIG. 4 is a flow chart showing another method for transmitting information, consistent with embodiments of the present disclosure.

FIG. 4 is a flow chart showing a method 400 for transmitting information. The method 400 may be performed by the terminal 101 and the server 102 in the system 100 shown in FIG. 1. The terminal 101 may has the function for transmitting information, such as a mobile phone, a tablet, or other mobile terminals. The server 102 may be a back-end server capable of executing an application program. Referring to FIGS. 1 and 4, the method 400 includes the following steps.

In step 401, the terminal 101 acquires a first network identifier of a detected first wireless communication network of at least one communication provider.

In one embodiment, the mobile terminal 101 may receive a network signal sent by a base station of the wireless communication network. After receiving the network signal, the mobile terminal 101 may acquire a network identifier of the wireless communication network. The mobile terminal 101 may receive network signals of a plurality of wireless communication networks provided by a plurality of the communication providers at a short period of time, and acquire network identities of the respective wireless communication networks. The mobile terminal 101 may acquire a network identifier of a detected wireless communication network of at least one communication provider after the mobile terminal 101 is turned on or receives an instruction of a user to perform detection of available networks.

In some embodiments, the step 401 is triggered by an event. For example, the step 401 may be triggered by a location change event. The mobile terminal 101 detects that its position is changed. If the changed distance exceeds a predetermined threshold, the mobile terminal 101 acquires a network identifier of a detected wireless communication network in its current location.

In one embodiment, the mobile terminal 101 may be provided with a position detection function, for example, a positioning function. When detecting that its position is changed and the changed distance exceeds a predetermined threshold, the mobile terminal 101 acquires the network identifier of the detected wireless communication network of at least one communication provider. The mobile terminal 101 may detect its position each time it is turned on, and compare a current position with the position detected last time to determine the distance of the positions. If the changed distance exceeds the predetermined threshold, the mobile terminal 101 acquires the network identifier of the detected wireless communication network. The mobile terminal 101 may use its position at some moment as a reference position. When a predetermined cycle for detecting position arrives, for example, every 10 minutes, the mobile terminal 101 detects its current position and determines the changed distance between the current position and the reference position. If the changed distance exceeds the predetermined threshold, the mobile terminal 101 acquires the network identifier of the detected wireless communication network. In some embodiments, the user may designate a particular position as the reference position of the mobile terminal 101. When the predetermined cycle for detecting position arrives, the mobile terminal 101 detects its current position and determines the changed distance between the current position and the designated reference position.

In some embodiments, the step 401 may be triggered by a time event. For example, when a predetermined cycle (e.g., every 5, 10, or 30 minutes) for detecting available wireless communication network arrives, the mobile terminal 101 acquires a network identifier of the detected wireless communication network at its current position.

In one embodiment, the mobile terminal 100 may predetermine the cycle for detecting the network identifier. When the predetermined cycle for detecting arrives, the mobile terminal 101 may detect the network signals of the wireless communication networks, to acquire the network identifiers of those wireless communication networks.

In step 402, the mobile terminal 101 sends a SIM card information request to the server 102. The SIM card information request includes at least the acquired first network identifier.

In one embodiment, the user may install an application program for requesting and acquiring the SIM car information in the mobile terminal 101. The mobile terminal 101 sends the SIM card information request to the server 102 through the application program after acquiring the first network identifier of the detected wireless communication network. The SIM card information request may include all of the acquired network identifiers including the first network identifier of a plurality of wireless communication networks of which the acquired signals are strong.

In some embodiments, the mobile terminal 101 may determine whether the wireless communication network that associates with the SIM card installed locally in the mobile terminal 101 is available at its current location. In one embodiment, in the step 402, if the network identifier of the SIM card installed locally is different from the acquired network identifier, the mobile terminal 101 determines that it is in a roaming state, and sends the SIM information request to the server 102. The SIM card information request includes at least one acquired network identifier.

In one embodiment, after acquiring the network identifiers of the detected wireless communication networks, the mobile terminal 101 may acquire the network identifier of the SIM card installed locally (local SIM card) to determine whether the wireless communication network associated with the network identifier of the local SIM card is available. If the network identifier of the local SIM card is among the acquired network identifiers, it indicates that the wireless communication network associated with the network identifier of the local SIM card is available. The mobile terminal 101 can transmit information using the local SIM card so that step 402 can be omitted. If the network identifier of the local SIM card is not among the acquired network identifiers, the mobile terminal 101 determines that it is in a roaming state and sends the SIM card information request to the server 102.

In one embodiment, the mobile terminal 101 may determine whether it is in a roaming state by checking identity information and encryption data of SIM cards corresponding to the acquired network identifiers. For example, if the network identifier of the local SIM card is different from the acquired one or more network identifiers, and the mobile terminal 101 does not store identity information and encryption data of the SIM cards of the wireless communication networks corresponding to the acquired network identifiers, the mobile terminal 101 determines that it is in a roaming state.

In some embodiments, in addition to having a local SIM card, the mobile terminal 101 stores identity information and encryption data of SIM cards of some wireless communication networks corresponding to some network identifiers. The identity information of the SIM card may include network identifiers of wireless communication networks corresponding to the SIM cards. After acquiring a network identifier of the detected wireless communication network, the mobile terminal 101 may acquire the network identifier of the local SIM card and the stored network identifiers of other SIM cards to check whether one of the network identifier of the local SIM card or the stored network identifiers of other SIM cards is among the acquired network identifiers. If one of the network identifier of the local SIM card or the stored network identifiers of the other SIM cards is one of the acquired network identifiers, the mobile terminal 101 does not send the SIM card information request. If the network identifier of the local SIM card and the stored network identifiers of other SIM cards are not in the acquired network identifiers, the mobile terminal 101 sends the SIM card information request to the server 102.

In step 403, the server 102 receives the SIM card information request from the mobile terminal 101. The SIM card information request includes at least the first network identifier acquired by the mobile terminal 101.

In one embodiment, after the server 102 receives the SIM card information request, it parses the SIM card information request to acquire the network identifiers therein for subsequent processing.

In step 404, the server 102 selects the first network identifier from the received at least one network identifier, and determines identity information and encryption data of a first SIM card, which are pre-stored in a storage device coupled to the server 102, corresponding to the first network identifier. The identity information and encryption data of the first SIM card are determined according to correlation between identity information and encryption data of a plurality of SIM cards, and the network identifiers of wireless communication networks.

Identity information of a SIM card includes information to identify the identity of the SIM card. The identity information of a SIM card may include IMSI (International Mobile Subscriber Identification Number), ICCID (Integrate Circuit Card Identity), etc. The encryption data of a SIM card is used to encrypt a secret key (for example, Key Identifier) for transmitting data between the encrypted SIM card and the server of the communication provider.

In one embodiment, the server 102 may store the identity information and encryption data of a plurality of SIM cards in advance and corresponding network identifiers of the wireless communication networks associated with the SIM cards, and correlate the network identifiers of the wireless communication networks with the identity information and encryption data of the SIM cards. After acquiring the network identifiers in the SIM card information request, the server 102 may select the first network identifier from the network identifiers at random, and determine the identity information and encryption data of a SIM card corresponding to the first network identifier based on the pre-established correlation.

In some embodiments, the server 102 may determine the identity information and encryption data of a SIM card based on a selection made by the mobile terminal 101. For example, the server 102 may send attribute information of the wireless communication networks to the terminal 101 corresponding to the network identifiers in the SIM card information request. The user, through the mobile terminal

101, selects a wireless network to be used. In some embodiments, the step 404 includes one or more of the following steps as shown in FIG. 5.

Figure 5:
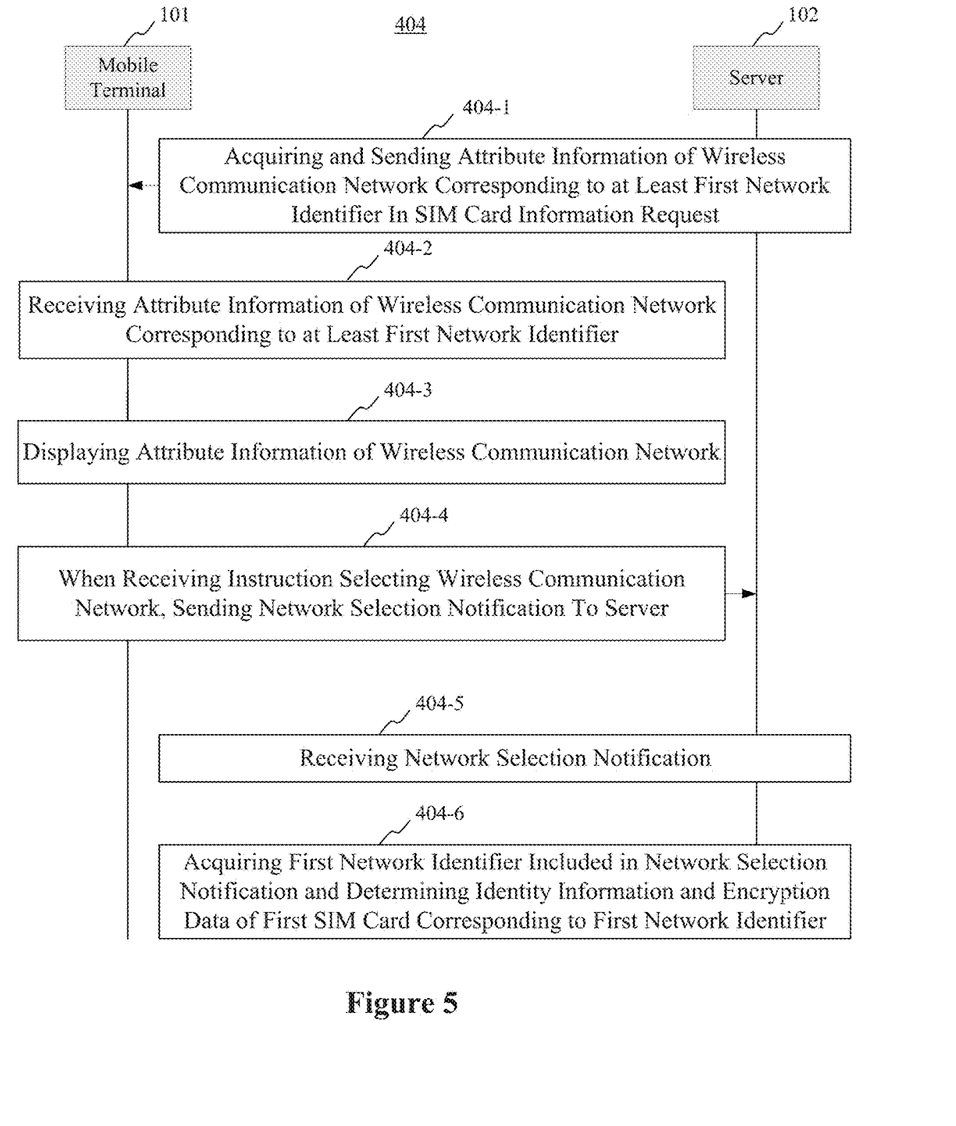
FIG. 5 is a flow chart showing detailed steps of step 404 shown in FIG. 4.

Referring to FIG. 5, in step 404-1, the server 102 acquires the attribute information of the wireless communication network corresponding to at least the first network identifier in the SIM card information request, and sends the attribute information to the mobile terminal 101.

In one embodiment, the server 102 may store the attribute information of each wireless communication network. The attribute information may comprise the names of the wireless communication networks, fee information of the wireless communication networks, etc. After acquiring the network identifiers included in the SIM card information request, the server 102 may acquire the attribute information of the wireless communication networks corresponding to the network identifiers respectively and send the attribute information to the mobile terminal 101.

In step 404-2, the mobile terminal 101 receives attribute information of the wireless communication network corresponding to at least the first network identifier sent by the server.

In step 404-3, the mobile terminal 101 displays the attribute information of the wireless communication network corresponding to at least the first network identifier.

In one embodiment, after receiving the attribute information of the wireless communication network corresponding to at least the first network identifier, the mobile terminal 101 may acquire and display the name and the fee information of the wireless communication network corresponding to at least the first network identifier.

In step 404-4, when receiving an instruction selecting the wireless communication network corresponding to the first network identifier, the mobile terminal 101 sends a network selection notification to the server 102. The network selection notification includes the first network identifier.

In one embodiment, after the mobile terminal 101 displays the name and the fee information of the wireless communication network, the user may select to use the wireless communication network. For example, the user may click or touch an item, shown in mobile terminal 101, corresponding to the wireless communication network to select the wireless communication network. After the user selects the wireless communication network, the mobile terminal 101 receives the selection instruction of the wireless communication network corresponding to the first network identifier, acquires the first network identifier, adds the first network identifier to the network selection notification, and sends the network selection notification to the server 102.

In step 404-5, the server 102 receives the network selection notification sent by the mobile terminal 101. The network selection notification includes the first network identifier.

In step 404-6, the serve 102 acquires the first network identifier included in the network selection notification and, according to the correlation between the identity information and encryption data of SIM cards and the network identifiers of the wireless communication networks, determines the identity information and encryption data of the first SIM card corresponding to the first network identifier.

In one embodiment, after receiving the network selection notification sent by the mobile terminal 101, the server 102 may parse the network selection notification, acquire the first network identifier included therein, and determine the identity information and encryption data of a SIM card corresponding to the first network identifier based on pre-stored correlation between the identity information and encryption data of SIM cards and the network identifiers of the wireless communication networks. In some embodiments, the server 102 may randomly select identity information and encryption data of the SIM card to be used, for example, when a plurality pieces of identity information and encryption data of the SIM card are available.

Referring again to FIG. 4, in step 405, the server sends the identity information and encryption data of the first SIM card to the mobile terminal.

In one embodiment, after determining the identity information and encryption data of the first SIM card, the server 102 sends the identity information and encryption data of the first SIM card to the mobile terminal 101. In some embodiments, the server 102 may also send password information, for example, PIN (Personal Identification Number) of the first SIM card to the mobile terminal 101.

In step 406, the mobile terminal 101 receives the identity information and encryption data of the first SIM card sent by the server 102. The first SIM card corresponds to the wireless communication network having the first network identifier.

In one embodiment, the mobile terminal 101 may receive and store the identity information and encryption data of the first SIM card in, for example, a secured chip which includes, but is not limited to, SE (secure element), TEE (Trusted Execution Environment), and EUICC (Embedded Universal Integrated Circuit Card), and the like.

In step 407, the mobile terminal 101 joins the wireless communication network corresponding to the first network identifier with the identity information and encryption data of the first SIM card and transmits information through the wireless communication network.

In one embodiment, each SIM card is provided with a corresponding word-symbol string. After receiving the identity information of the first SIM card, the mobile terminal 101 may acquire the string of the first SIM card, encrypt the string through the encryption data and an encryption algorithm in the above-mentioned application program installed in the mobile terminal 101, and send the identity information of the first SIM card and the encrypted string to a network server of the wireless communication network (i.e., the wireless communication network corresponding to the first network identifier, hereinafter as "Net 1" illustrated in FIG. 1) corresponding to the first SIM card. After receiving the information from mobile terminal 101, the network server may, according to the identity information of the first SIM card, determine the word-symbol string corresponding to the first SIM card stored in a local database of the network server, and encrypt the string with local encryption data and a predetermined encrypted algorithm. The network server further compares the locally encrypted string with the received encrypted string to determine whether they are the same. If they are the same, the network server allows the mobile terminal 101 to join in Net 1 through the first SIM card. If they are different, the network server refuses the mobile terminal 101 to join in Net 1 through the first SIM card.

The mobile terminal 101 may be provided with a processing component in advance to execute the above processing. After joining in the wireless communication network corresponding to the first network identifier, the mobile terminal 101 may transmit information through the wireless communication network, for example, browsing network information, downloading data, or perform mobile communication. The use of the wireless communication network may be charged according to the local fee standard where the wireless communication network located, as indicated in the attribute information.

In the illustrated embodiments, a mobile terminal is configured to detect nearby wireless communication networks and acquire a first network identifier of one detected first wireless communication network of at least one communication provider. The mobile terminal sends a SIM card information request to a server, the SIM card information request including the acquired first network identifier, and receives identity information and encryption data of a first SIM card sent by the server. The first SIM card corresponds to the first wireless communication network having the first network identifier so that the mobile terminal may join in the first wireless communication network using the identity information and encryption data of the first SIM, and transmit information through the first wireless communication network. In the illustrated embodiments, the mobile terminal may transmit information through a local wireless communication network, without going through the wireless communication network that provides the SIM card installed in the mobile terminal. Therefore, the efficiency of information transmission is improved.

Figure 6:
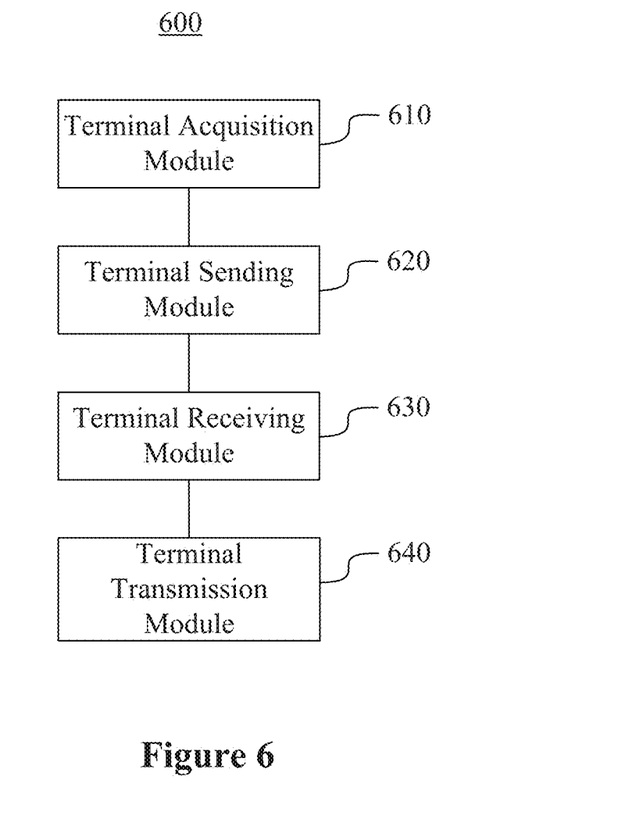
FIG. 6 is a block diagram of a terminal, consistent with embodiments of the present disclosure.

The present disclosure further provides a terminal for executing all or a portion of the steps in the above methods. FIG. 6 is a block diagram of a terminal 600 for transmitting information, consistent with embodiments of the present disclosure. The terminal 600 may be the terminal 101 shown in FIG. 1. As shown in FIG. 6, the terminal 600 includes a terminal acquisition module 610, a terminal sending module 620, a terminal receiving module 630, and a terminal transmission module 640.

The terminal acquisition module 610 is configured to acquire a first network identifier of a detected first wireless communication network of at least one communication provider.

The terminal sending module 620 is configured to send a SIM card information request to a server, such as the server 102. The SIM card information request includes at least the acquired first network identifier.

The terminal receiving module 630 is configured to receive first SIM card identity information and encryption data sent from the server 102. The first SIM card corresponds to the first wireless communication network having the first network identifier.

The terminal transmission module 640 is configured to join the first wireless communication network having the first network identifier with the first SIM card identity information and encryption data, and transmits information through the first wireless communication network.

In some embodiments, the terminal sending module 620 is configured to, if the network identifier of the SIM card installed locally in the terminal 600 is different from the acquired network identifier, determine that the terminal 600 is in a roaming state and send the SIM card information request to the server. The SIM card information request includes at least one acquired network identifier.

In some embodiments, the terminal sending module 620 is configured to, if the network identifier of the SIM card installed locally is different from the acquired one or more network identifiers, and the terminal 600 does not store identity information and encryption data of the SIM cards of the wireless communication networks corresponding to the acquired network identifiers, determine that the terminal 600 is in the roaming state In some embodiments, the terminal acquisition module 610 is configured to, when the terminal 600 detects that its position is changed and that a changed distance exceeds a predetermined threshold, acquire the network identifier of the detected wireless communication network of at least one communication provider.

In some embodiments, the terminal acquisition module 610 is configured to, when a predetermined cycle for detecting available wireless communication networks arrives, acquire the network identifier of the detected wireless communication network of at least one communication provider.

In some embodiments, the terminal receiving module 630 is also configured to receive attribute information of the wireless communication network corresponding to at least one acquired network identifier, and display the attribute information.

In some embodiments, the terminal sending module 620 is also configured to, when the terminal 600 receive an instruction selecting the wireless communication network corresponding to the first network identifier, send a network selection notification to the server. The network selection notification includes the first network identifier.

Figure 7:
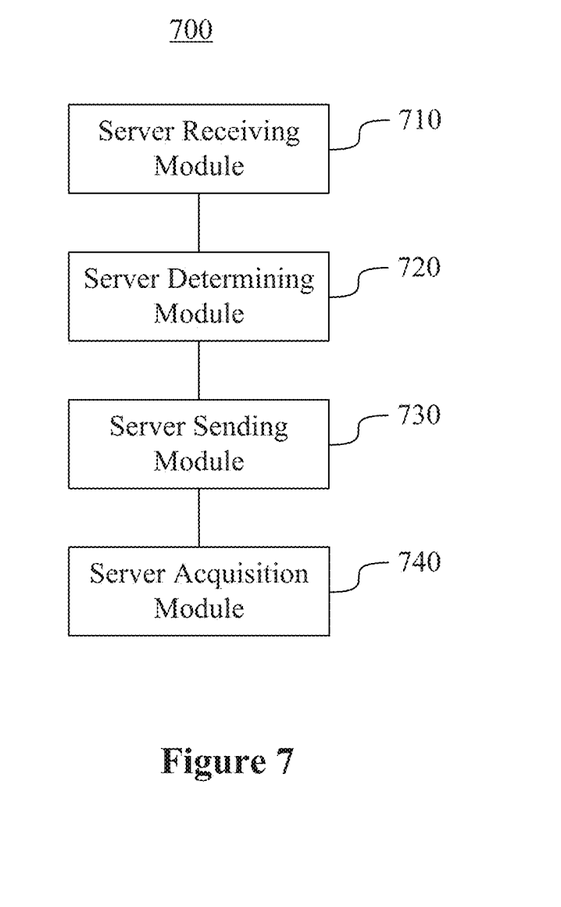
FIG. 7 is a block diagram of a server, consistent with embodiments of the present disclosure.

The present disclosure further provides a server for executing all or a portion of the steps in the above methods. FIG. 7 is a block diagram of a server 700 for transmitting information, consistent with embodiments of the present disclosure. The server 700 may be the server 102 shown in FIG. 1. As shown in FIG. 7, the server 700 includes a server receiving module 710, a server determining module 720, and a server sending module 730.

The server receiving module 710 is configured to receive a SIM card information request sent by a mobile terminal. The SIM card information request includes at least one network identifier acquired by the mobile terminal.

The server determining module 720 is configured to select a first network identifier from the received at least one network identifier, and determines identity information and encryption data of a first SIM card, which are pre-stored in a storage device coupled to the server 102, corresponding to the first network identifier. The identity information and encryption data of the first SIM card are determined according to correlation between identity information and encryption data of a plurality of SIM cards, and the network identifiers of wireless communication networks.

The server sending module 730 is configured to send the identity information and encryption data of the first SIM card to the mobile terminal.

In some embodiments, the server 700 further includes a server acquisition module 740, configured to acquire attribute information of the wireless communication network corresponding to at least one network identifier, and send the attribute information to the mobile terminal.

In some embodiments, the server receiving module 710 is configured to receive the network selection notification sent by the mobile terminal. The network selection notification includes the first network identifier.

In some embodiments, the server determining module 720 is configured to acquire the first network identifier included in the network selection notification, and determine the identity information and encryption data of the first SIM card corresponding to the first network identifier according to pre-stored correlation between identity information and encryption data of a plurality of SIM cards, and the network identifiers of wireless communication networks.

Other detailed functions and actions of the modules of the terminal 600 and the server 700 can be referred to the steps explained in the methods 200, 300, and 400, and are not repeated herein.

The present disclosure further provides a system for transmitting information. The system includes the terminal 600 and the server 700.

The terminal 600 is configured to acquire a network identifier of a detected wireless communication network of at least one communication provider and send a SIM card information request to the server 700. The SIM card information request includes at least one acquired first network identifier. The terminal 600 is configured to receive identity information and encryption data of a first SIM card sent by the server 700. The first SIM card corresponds to the wireless communication network having the first network identifier. The terminal 600 is configured to transmit information by joining in the wireless communication network corresponding to the first network identifier with the identity information and encryption data of the first SIM.

The server 700 is configured to receive the SIM card information request sent by the terminal 600, select the first network identifier from at least one network identifier included in the SIM card information request, determine the identity information and encryption data of the first SIM card corresponding to the first network identifier according to pre-stored correlation between the identity information and encryption data of SIM cards and the network identifiers of wireless communication networks, and send the identity information and encryption data of the first SIM card to the terminal 600.

Figure 8:
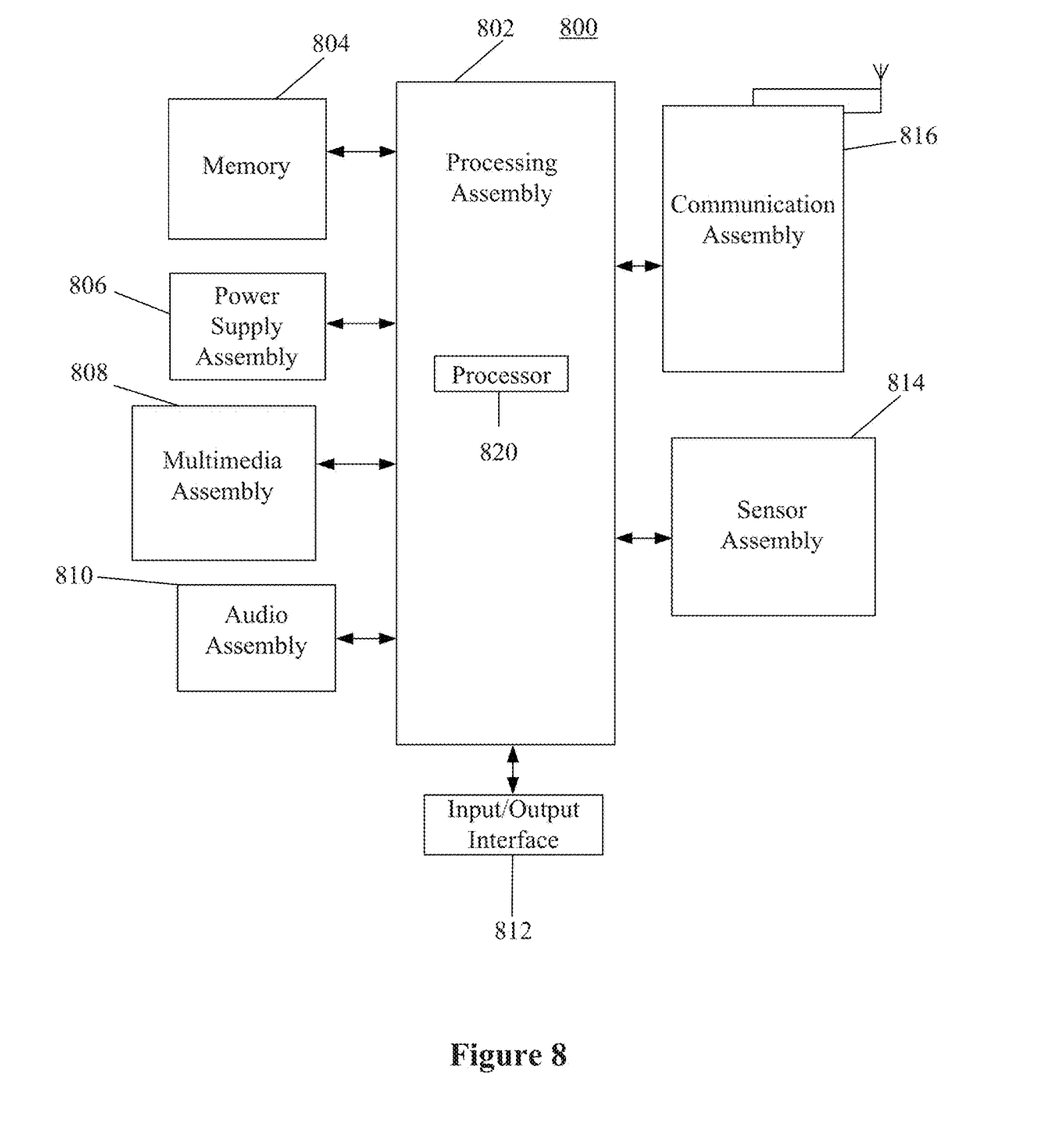
FIG. 8 is a block diagram of a terminal, consistent with embodiments of the present disclosure.

FIG. 8 is a block diagram of a terminal 800, consistent with embodiments of the present disclosure. The terminal 800 may be the terminal 101 or 600, and may be a mobile phone, tablet, notebook, etc.

Referring to FIG. 8, the terminal 800 may include one or more of the following components: a processing assembly 802, a memory 804, a power supply assembly 806, a multimedia assembly 808, an audio assembly 810, an input/output (I/O) interface 812, a sensor assembly 814 and a communication assembly 816.

The processing assembly 802 generally controls the whole operations of the terminal 800, for example, display, phone call, data communication, camera operation and record operation. The processing assembly 802 may include one or more processors 820 to implement an instruction to complete all or part of steps of the above methods. In addition, the processing assembly 802 may include one or more modules to facilitate the interaction between the processing assembly 802 and other assemblies. For example, the processing assembly 802 may include a multimedia module to facilitate the interaction between the processing assembly 808 and the processing assembly 802.

The memory 804 is configured to store various types of data to support the operation performed on the terminal 800. The examples of such data include an instruction of any application program or method, contact data, address book data, massages, pictures, videos, etc. which are operated on the terminal 800. The memory 804 may be realized with any kind of a volatile and non-volatile storage device or combination thereof, for example, Static Random Access Memory (SRAM), Electrically-Erasable Programmable Read Only Memory (EEPROM), Erasable Programmable Read Only Memory (EPROM), Programmable Read Only Memory (PROM), Read Only Memory (ROM), a magnetic memory, a flash memory, a magnetic disk or an optical disk.

The power supply assembly 806 provides power for various assemblies of the terminal 800. The power supply assembly 806 may include a power supply management system, one or more power supplies, and other assemblies for generating, managing and distributing power to an audio output apparatus 800.

The multimedia assembly 808 includes a screen providing an output interface between the terminal 800 and the user. In some embodiments, the screen may include a Liquid Crystal Display (LCD) and a Touch Panel (TP). If the screen includes the touch panel, the screen may be realized as a touch screen to receive an input signal from the user. The touch panel includes one or more touch sensors to sense the touching, sliding and the gestures on the touch panel. The touch sensor may not only sense the touching or border of sliding gesture but only detect the duration time and pressure related to touching or sliding operation. In some embodiments, the multimedia assembly 808 includes one front-facing camera and/or one rear-facing camera. When the terminal 800 is under an operation mode, for example, a shooting mode or a video mode, the front-facing camera and/or the rear-facing camera may receive outside multimedia data. Each one of front-facing camera and rear-facing camera may be one fixed optical lens system or have focal length or optical zoom ability.

The audio assembly 810 is configured to output and/or input audio signal. For example, the audio assembly 810 includes one microphone (MIC). When the audio output apparatus 800 is under the operation mode, for example, a calling mode, a record mode and a speech recognition mode, the microphone is configured to receive outside audio data. The received audio signal may be further stored in the memory 804 or sent via the communication assembly 816.

The I/O interface 812 provides an interface between the processing assembly 802 and a peripheral interface module. The above peripheral interface module may be a keyboard, a click wheel, and button, etc. The button may include but not limit to home page button, volume button, start button and lock button.

The sensor assembly 814 includes one or more sensors and is configured to provide various aspects of the assessment state for the terminal 800. For example, the sensor assembly 814 may detect the on/off state of the terminal 800, the relative positioning of the assemblies (for example, the assemblies are display and a keypad of the terminal 800), position change of the terminal 800 or one assembly of the terminal 800, presence or absence of the touch between the user and the terminal 800, as well as the orientation or acceleration/deceleration and temperature change of the terminal 800. The sensor assembly 814 may include a proximity sensor configured to detect the presence of an adjacent object when there is not any physical contact. The sensor assembly 814 may also include an optical sensor (such as CMOS or a CCD image sensor) configured to be used in imaging application. In some embodiments, the sensor assembly 814 may also include an acceleration sensor, a gyro sensor, a magnetic sensor, a pressure sensor or a temperature sensor.

The communication assembly 816 is configured to facilitate the wired or wireless communication between the terminal 800 and other apparatuses. The terminal 800 may access the wireless network based on a communication standard, such as WiFi, 2G or 3G or the combination thereof. In one exemplary embodiment, the communication assembly 816 receives a broadcast signal or broadcast associated information from an external broadcast management system via a broadcast channel. In one exemplary embodiment, the communication assembly 816 also includes a Near Field Communication (NFC) module to facilitate short-range communication. For example, the NFC module may be based on Radio Frequency Identification (RFID) technology, Infrared Data Association (IrDA) technology, Ultra-Wideband (UWB) technology, Bluetooth (BT) technology and other technologies.

In an exemplary embodiment, the terminal 800 may be realized through one or more of an Application Specific Integrated Circuits (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, or other electronic elements, and configured to carry out the method described above.

In an exemplary embodiment, there is provided a non-transitory computer-readable storage medium including instruction, such as included in the memory 804, executable by the processor 820 of the terminal 800, to perform one or more of the steps in the above methods. For example, the non-transitory computer-readable storage medium may be a ROM, a random access memory (RAM), a CD-ROM, a magnetic tape, a floppy disk, an optical data storage devices and the like.

Figure 9:
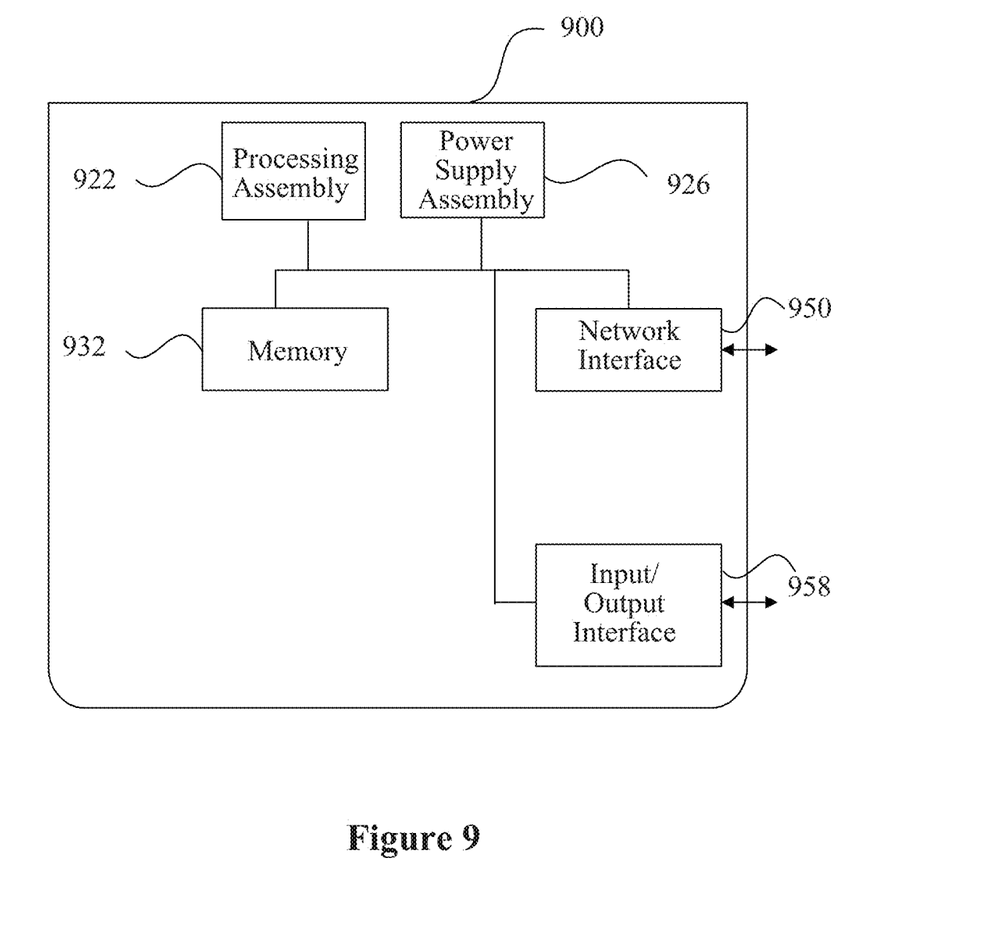
FIG. 9 is a block diagram of a server, consistent with embodiments of the present disclosure.

FIG. 9 is a block diagram showing a device 900 for transmitting information in accordance with an exemplary embodiment. For example, the device 900 may be a server, such as the server 102 or 700. Referring to FIG. 9, the device 900 includes a processing assembly 922 which further includes one or more processors, and memory resource represented by a memory 932 for storing the instruction carried out by the processing assembly 922, e.g., an application program. The application program stored in the memory 932 may include one or more modules each of which corresponds to a set of instructions. Moreover, the processing assembly 922 is configured to carry out instructions to perform the above methods.

The device 900 may also include a power supply assembly 926 configured to perform the management of the device 900, one wired or wireless network interface 950 configured to connect the device 900 to the network, and one input/output (I/O) interface 958. The device 900 can be operated based on the operating system stored in the memory 932, for example, Windows Server™, Mac OS X™, Unix™, Linux™, FreeBSD™ or the like.

One of ordinary skill in the art will understand that the above-described modules can each be implemented by hardware, or software, or a combination of hardware and software. One of ordinary skill in the art will also understand that multiple ones of the above-described modules may be combined as one module, and each of the above-described modules/units may be further divided into a plurality of sub-modules.

Other embodiments of this disclosure will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as only, with a true scope and spirit of the invention being indicated by the following claims.

It will be appreciated that the present disclosure is not limited to the exact construction that has been described above and illustrated in the accompanying drawings, and that various modifications and changes can be made without departing from the scope thereof. The scope of the present disclosure is only defined by the appended claims.

What is claimed is:

1. A method for transmitting information performed by a terminal, comprising:
    acquiring a first network identifier of a detected wireless communication network;
    sending a SIM card information request to a server, the SIM card information request including at least the first network identifier;
    receiving identity information and encryption data of a first SIM card sent by the server, the first SIM card corresponding to the detected wireless communication network corresponding to the first network identifier included in the SIM card information request; and
    joining the detected wireless communication network corresponding to the first network identifier using the identity information and encryption data of the first SIM card, and transmitting information through the detected wireless communication network.

2. The method according to claim 1, wherein the sending the SIM card information request to the server comprises:
    if a network identifier of a currently-used SIM card is different from all of acquired network identities, determining that the terminal is in a roaming state and sending the SIM card information request to the server.

3. The method according to claim 2, the sending the SIM card information request to the server further comprises:
    if identity information and encryption data of the first SIM card corresponding to the wireless communication network having the first network identifier are not stored locally in the terminal, determining that the terminal is in a roaming state and sending the SIM card information request to the server.

4. The method according to claim 1, wherein the acquiring the first network identifier of the detected wireless communication network further comprises:
    when detecting that a position of the terminal is changed and that a changed distance exceeds a predetermined threshold, acquiring the first network identifier of the detected wireless communication network.

5. The method according to claim 1, wherein the acquiring the first network identifier of the detected wireless communication network further comprises:
    when a predetermined cycle for detecting a wireless communication network arrives, acquiring the first network identifier of the detected wireless communication network.

6. The method according to claim 1, further comprising:
    receiving attribute information of the wireless communication network corresponding to the first network identifier;
    displaying the attribute information; and
    when receiving an instruction selecting the wireless communication network corresponding to the first network identifier, sending a network selection notification to the server, the network selection notification including the first network identifier.

7. A method for transmitting information performed by a server, comprising:
    receiving a SIM card information request sent by a mobile terminal, wherein the SIM card information request including at least one network identifier acquired by the mobile terminal;
    selecting a first network identifier from the at least one network identifier, and determining identity information and encryption data of a first SIM card corresponding to the first network identifier; and
    sending the identity information and encryption data of the first SIM card to the mobile terminal.

8. The method according to claim 7, further comprising:
acquiring attribute information of a wireless communication network corresponding to the first network identifier;
sending the attribute information to the mobile terminal;
receiving network selection notification sent by the mobile terminal, wherein the network selection notification including the first network identifier; and
determining the identity information and encryption data of the first SIM card corresponding to the first network identifier based on the network selection notification.

9. A device for transmitting information, comprising:
a processor; and
a memory for storing instructions executable by the processor,
wherein the processor is configured to:
acquire a first network identifier of a detected wireless communication network;
send a SIM card information request to a server, the SIM card information request including at least the first network identifier;
receive identity information and encryption data of a first SIM card sent by the server, the first SIM card corresponding to the detected wireless communication network corresponding to the first network identifier included in the SIM card information request; and
join the detected wireless communication network corresponding to the first network identifier using the identity information and encryption data of the first SIM card, and transmit information through the detected wireless communication network.

10. The device according to claim 9, wherein the processor is further configured to:
if a network identifier of a currently-used SIM card is different from all of acquired network identities, determine that the terminal is in a roaming state and send the SIM card information request to the server.

11. The device according to claim 10, wherein the processor is further configured to:
if identity information and encryption data of the first SIM card corresponding to the wireless communication network having the first network identifier are not stored locally in the terminal, determine that the terminal is in a roaming state and send the SIM card information request to the server.

12. The device according to claim 9, wherein the processor is further configured to:
when detecting that a position of the terminal is changed and that a changed distance exceeds a predetermined threshold, acquire the first network identifier of the detected wireless communication network.

13. The device according to claim 9, wherein the processor is further configured to:
when a predetermined cycle for detecting is reached, acquire the network identifier of the currently detected wireless communication network of at least one communication provider.

14. The device according to claim 9, wherein the processor is further configured to:
receive attribute information of the wireless communication network corresponding to the first network identifier;
display the attribute information; and
when receiving an instruction selecting the wireless communication network corresponding to the first network identifier, send a network selection notification to the server, the network selection notification including the first network identifier.

15. A device for transmitting information, comprising:
a processor; and
a memory for storing instructions executable by the processor,
wherein the processor is configured to:
receive a SIM card information request sent by a mobile terminal, wherein the SIM card information request including at least one network identifier acquired by the mobile terminal;
select a first network identifier from the at least one network identifier, and determine identity information and encryption data of a first SIM card corresponding to the first network identifier; and
send the identity information and encryption data of the first SIM card to the mobile terminal.

16. The device according to claim 15, wherein the processor is further configured to:
acquiring attribute information of a wireless communication network corresponding to the first network identifier;
sending the attribute information to the mobile terminal;
receiving network selection notification sent by the mobile terminal, wherein the network selection notification including the first network identifier; and
determining the identity information and encryption data of the first SIM card corresponding to the first network identifier based on the network selection notification.

* * * * *